(12) United States Patent (10) Patent No.: US 7,956,819 B2
Tomisawa et al. (45) Date of Patent: Jun. 7, 2011

(54) STEREOSCOPIC TWO-DIMENSIONAL IMAGE DISPLAY DEVICE

(75) Inventors: Isao Tomisawa, Saitama (JP); Masaru Ishikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 715 days.

(21) Appl. No.: 11/664,220

(22) PCT Filed: Sep. 28, 2005

(86) PCT No.: PCT/JP2005/017855
§ 371 (c)(1),
(2), (4) Date: Sep. 12, 2007

(87) PCT Pub. No.: WO2006/035816
PCT Pub. Date: Apr. 6, 2006

(65) Prior Publication Data
US 2008/0030428 A1 Feb. 7, 2008

(30) Foreign Application Priority Data
Sep. 30, 2004 (JP) .................................. 2004-288662

(51) Int. Cl.
*G09G 5/00* (2006.01)
*G02B 27/22* (2006.01)
(52) U.S. Cl. .......................... 345/1.1; 715/700; 359/462
(58) Field of Classification Search ............ 345/1.1–1.3, 345/2.1–2.3, 3.1–3.3
See application file for complete search history.

(56) References Cited

U.S. PATENT DOCUMENTS
7,376,903 B2 * 5/2008 Morita et al. ................. 715/757

2002/0032043 A1 * 3/2002 Ishikawa ....................... 455/566

FOREIGN PATENT DOCUMENTS
| JP | 3-217925 A | 9/1991 |
| JP | 8-511365 A | 11/1996 |
| JP | 9-16312 A | 1/1997 |
| JP | 9-265376 A | 10/1997 |
| JP | 10-062717 A | 3/1998 |
| JP | 2001-255493 A | 9/2001 |
| JP | 2002077341 A | 3/2002 |
| JP | 2003098479 A | 4/2003 |
| JP | 2003156712 A | 5/2003 |

OTHER PUBLICATIONS

Japanese Office Action, dated Aug. 31, 2010, issued in Application No. 2006-537773.

* cited by examiner

*Primary Examiner* — Duc Q Dinh
(74) *Attorney, Agent, or Firm* — Sughrue Mion, PLLC

(57) ABSTRACT

There is provided a stereoscopic two-dimensional image display device including: a stereoscopic image display unit that includes a display unit having an image display surface that displays an image, and an image transmitting panel apart from the image display surface, and a stereoscopic two-dimensional image by imaging light emitted from the image display surface, on an imaging surface at a side opposite to the display unit with respect to the image transmitting panel; a position detecting sensor that outputs an output signal corresponding to a position of a detection target inserted to the imaging surface; and a control unit that changes the image displayed on the image display surface in accordance with the output signal from the position detecting sensor so as to change the stereoscopic two-dimensional image displayed on the imaging surface. A user interface region is formed on a peripheral portion of the imaging surface.

14 Claims, 19 Drawing Sheets

STEREOSCOPIC TWO-DIMENSIONAL IMAGE DISPLAY DEVICE

TECHNICAL FIELD

The present invention relates to a stereoscopic two-dimensional image display device which stereoscopically displays a two-dimensional image into a virtual three-dimensional image by using an image transmitting panel.

BACKGROUND ART

It is known that a stereoscopic two-dimensional image display device. The device provides a image of lights emitted from a displaying surface on a front space of a micro lens array and stereoscopically displays a two-dimensional image into a pseudo three-dimensional image in the space, by disposing a micro lens array which is one of image transmitting panels so as to be apart from a front side of the display surface of the two-dimensional image at predetermined interval (For example, refer to Patent Documents 1, 2, 3, and 4).

Patent Document 1: JP-A-2001-255493
Patent Document 2: JP-A-2003-98479
Patent Document 3: JP-A-2002-77341
Patent Document 4: JP-A-2003-156712

DISCLOSURE OF THE INVENTION

Problem that the Invention is to Solve

Such kind of the known stereoscopic two-dimensional image display device merely stereoscopically displays two-dimensional image. Accordingly, an observer can see the stereoscopic two-dimensional image in only a passive position, but the observer can not perform any action on the stereoscopic two-dimensional image, thereby being not possible to make an interactive communication between the stereoscopic two-dimensional image display device and the observer. As a result, the observer may feel insufficient amusement.

Additionally, it is preferable to have an intuitive and excellent manipulative interface when an observer uses the interactive communication. However, the stereoscopic two-dimensional image display device having an intuitive and excellent manipulative interface has not been concretely proposed.

Regarding problems that the present invention is to solve, it can give several examples about the problems that the known usual stereoscopic two-dimensional image display device merely stereoscopically displays a two-dimensional image, an observer can not perform any action on the displayed stereoscopic two-dimensional image, the stereoscopic two-dimensional image display device having an intuitive and excellent manipulative interface has not proposed and the like.

Means for Solving the Problem

According to an aspect of the invention, a stereoscopic two-dimensional image display device includes: a stereoscopic image display unit that includes a display unit having an image display surface that displays an image and an image transmitting panel that is disposed apart from the image display surface, and displays a stereoscopic two-dimensional image by imaging light emitted from the image display surface, on an imaging surface in a space located at a side opposite to the display unit with respect to the image transmitting panel; a position detecting sensor that outputs an output signal corresponding to a position of a detection target inserted to the imaging surface; and a control unit that changes the image displayed on the image display surface in accordance with the output signal from the position detecting sensor so as to change the stereoscopic two-dimensional image displayed on the imaging surface, wherein a user interface region is formed on a peripheral portion of the imaging surface.

BEST MODE FOR CARRYING OUT THE INVENTION

Hereinafter, referring to drawings, it will be described about an embodiment of a stereoscopic two-dimensional image display device according to the invention.

First Embodiment

First, a first embodiment of a stereoscopic two-dimensional image display device according to the invention will be described.

FIG. 1 is a view illustrating a schematic configuration of the stereoscopic two-dimensional image display device M according to the embodiment, and FIG. 2 is a sectional view taken along line II-II of FIG. 1 as viewed in the direction of an arrow.

The stereoscopic two-dimensional image display device M of the embodiment is a virtual stereoscopic image display device that displays a visible two-dimensional image as a three-dimensional display on a predetermined stereoscopic image display surface (an imaging surface) in a space.

Specifically, the stereoscopic two-dimensional image display device M includes a case 20, a display unit 1, an image transmitting panel 3, and a position detecting sensor 10 as shown in the FIGS. 1 and 2. The stereoscopic two-dimensional image display device M of the embodiment further includes a display driving unit 11, a sensor driving unit 12, an image generating unit 13, and a control unit 15 as a control system as shown in FIG. 2. Hereinafter, first, it will be described about each component of the stereoscopic two-dimensional image display device M in detail.

The case 20 is a box-like member of a rectangular parallelepiped shape. A rectangular opening 20a of which four edges are surrounded by ends of an outer wall 20b is formed on one side of the case 20, an inside and an outside of the case 20 are communicated through the opening 20a, and the inside of the case 20 contains the display unit 1, the image transmitting panel 3, and the position detecting sensor 10.

The display unit 1 is a display device disposed on an inner surface of the case 20 opposed to the opening 20a and includes a liquid crystal display, an EL panel, a CRT, or the like. The display unit 1 includes an image display surface 1a having a plurality of pixels on a side of the opening 20a, whereby light of a color and an intensity with respect to an image is emitted from each pixel. In consideration of a decrease in size of the case 20, a panel type display such as a liquid crystal display and an EL panel is used as the display unit 1 in FIG. 2.

The image transmitting panel 3 is disposed with a predetermined distance from the image display surface 1a, on the side of the opening 20a of the image display surface 1a of the display unit 1 in the case 20. The image transmitting panel 3 includes two micro lens arrays 3a and 3b for example, as shown in FIG. 3. Each of the micro lens arrays 3a and 3b includes transparent substrates 4 made of a glass or resin plate having excellent translucency and a plurality of micro convex lenses 5 on both side of the transparent substrates 4 in an array shape. An optic axis of each micro convex lens 5 formed on one side of each transparent substrate 4 is arranged so as to coincide with an optic axis of each micro convex lens 5 on the other side. In this description, it is described as examples using the micro lens array of which lens array surfaces are formed on all of each surface (i.e. the surfaces are totally four) of two lens array, but it is not limited in this configuration of the micro lens array.

When light corresponding to an image emitted from the image display surface 1a of the display unit 1 enters on one side of the image transmitting panel 3, the panel makes the light exit from the other side thereof and forms an image on the stereoscopic image display surface 2 as apart as a predetermined distance toward a side opposed to the image display surface 1a. An aggregation of the light as an image formed by the image transmitting panel 3 corresponds to the image displayed on the image display surface 1a. That is, the image transmitting panel 3 displays the image of the image display surface 1a on the stereoscopic image display surface 2 which is two-dimensional plane existing in a space. Herein, the stereoscopic image display surface 2 is not an actual object but a virtual plane in a space. The plane is one plane in the space defined by an operating distance of the image transmitting panel 3, and that is set near the opening 20a of the case 20 according to the embodiment.

The image formed on the stereoscopic image display surface 2 is two-dimensional image. When the image has the depth feeling or a background image of the display unit 1 is black and a contrast of an object in the image is highlighted, it is seen from a front observer as if the stereoscopic image is projected in space. That is, the two-dimensional image displayed on the stereoscopic image display surface 2 is recognized by the observer as an image which is seen virtually and stereoscopically (hereinafter, it is referred to as a stereoscopic two-dimensional image). In the embodiment as mentioned above, the stereoscopic image display unit 6 displays the stereoscopic two-dimensional image, so as to image light correspond to an image on the stereoscopic image display surface 2 (i.e. an imaging surface) by using the display unit 1 and the image transmitting panel 3.

On the other hand, the position detecting sensor 10 is dispose on an inner peripheral side in the opening 20a of the case 20, that is, an inner peripheral surface near end of the outer wall 20b (or it may be possible to dispose in the vicinity thereof). The position detecting sensor 10 is a sensor that detects a position of an object (detection target) such as user's fingers inserted into a predetermined detection region and outputs a signal according to the detected position to the sensor driving unit 12. A two-dimensional position detecting sensor or a three-dimensional position detecting sensor may be available as the position detecting sensor 10, depending on applications.

For example, when the position detecting sensor 10 is the two-dimensional position detecting sensor, the stereoscopic image display surface 2 or a peripheral plane thereof is set as an inspective plane which is a detection region. When an object such as fingers and stick is cross over there, a detection signal according to the position is outputted.

The display driving unit 11 controls the display unit 1 according to an image sent from the control unit 15. Specifically, the display driving unit 11 receives the image data generated from the image generating unit 13 through the control unit 15 and displays an image corresponding to the image data on the image display surface 1a of the display unit 1.

The sensor driving unit 12 drives the position detecting sensor 10 and receives a detection signal indicating a position of a detection target detected by position detecting sensor 10. The received detection signal is sent to the control unit 15.

The control unit 15 is a control unit which controls operations of the display driving unit 11, the sensor driving unit 12, the image generating unit 13 and the like. The display driving unit 11, sensor driving unit 12, and image generating unit 13 is operated in response to instructions from the control unit 15.

When the detection signal received through the sensor driving unit 12 is a predetermined signal, the control unit 15 is configured so as to instruct the image generating unit 13 to generate an image, make the image generated by the image generating unit 13 display on the image display surface 1a through the display driving unit 11, and additionally, make a voice corresponding to the generated image output from a voice output portion which is not illustrated.

The image generating unit 13 generates an image data displayed on the display unit 1, for example, it is configured to generate an image in accordance with a predetermined program. The image generating unit 13 memorizes a predetermined image or picture in advance and may be configured so as to output the memorized image or picture to the control unit 15 in accordance with the orders from the control unit 15.

Since the stereoscopic two-dimensional image display device M of the embodiment is configured as mentioned above, it is not only a display device which displays the stereoscopic two-dimensional image, but also a display device which makes the stereoscopic two-dimensional image display change so as to adapt in accordance with a user's operation.

FIG. 4 is a schematic diagram illustrating the stereoscopic image display surface 2 on which the stereoscopic two-dimensional image is displayed by the stereoscopic two-dimensional image display device M seen from a front. FIG. 5 is a view illustrating a state that user manipulate the stereoscopic two-dimensional image display device M by using his finger.

As shown in FIG. 4, the stereoscopic two-dimensional image display device M of the embodiment displays a main image (for example, character image, object image, and the like) on a central region 2a which is located on a center of the stereoscopic image display surface 2. A peripheral region 2b located around the central region 2a is configured as various kinds of a user interface region, and displays an icon image corresponding to various kind instructions provided by a user. In the embodiment, the position detecting sensor 10 sets the peripheral region 2b displaying the icon image as a sensing region (hereinafter, it is referred to as a user interface region) for a user interface only, and the control unit 15 makes the image displayed on the central region 2a change in accordance with an operation corresponding to a meaning of an icon image displayed on the detected position, when the detection target such as a user's finger is detected in a position corresponding to the icon image.

Usually, a user tries to press the icon image by using own fingers, but the icon image is displayed in space, therefore there is no existing on the region corresponding to the icon image so that manipulating hands should hold in space. Because of the reason, it is also considered that the user may be tired of manipulating by holding hands in space.

However, according to the embodiment, since the user interface region is set on the peripheral region 2b which is a peripheral portion of the stereoscopic image display surface 2, the user can insert a thumb in the region in which the icon image is displayed, in the state that the hands hold on a supporting member (such as the outer wall 20b of the case 20)

which is located in the vicinity of the peripheral region 2b of the stereoscopic image display surface 2 (the imaging surface), in the state that four fingers such as an index, middle, ring and little finger lay on the outer wall 20b of the case 20, and as feel like pressing the region corresponding to the icon image on the basis of case 20 itself as shown in FIG. 5. Herein, the peripheral portion indicates a region having a predetermined region to an inner direction from an outer peripheral portion of the imaging surface. When such as an icon is disposed so that the user interface region is provided to the central region of the imaging surface and the icon is attempted to be pressed by fingers, it occasionally occurs that a display of a main image displayed with the icon on the central region is interrupted. The reason is that light being incident toward the imaging surface from the image display surface of the display unit is interrupted by the hands pressing the icon so that an image formation of the main image is interfered. However, as in the embodiment, the user interface region is disposed on the peripheral portion. As a result, there is also an advantage that the hands of the user manipulating the user interface region may not interrupt the display of the main image.

Additionally, in that case, it is possible to perform an accurate manipulation since the hands is not shaken by fixing hands position using the supporting member (such as the outer wall 20b of the case 20) and perform easily an manipulation for long time since the user's hands are not so tired. In the embodiment, it also makes easily a focus of user's eyes visibly coincide with the stereoscopic two-dimensional image, and it will be expected to improve a visibility, since the case 20 performs the function as a comparable reference in a space.

Herein, detailed display examples will be described.

FIG. 6 is a diagram illustrating a display example of the stereoscopic image display surface 2.

In the example in FIG. 6, an image of a pot is displayed on the central region 2a of the stereoscopic image display surface 2, and a plurality of icon images 31 to 44 is displayed as a manipulation menu on the peripheral region 2b, as if the icon surrounds the image of the pot. For example, it is expressed on an icon image 31 that a phrase which is "magnifying" is projected in the form of a button. When a user tries to press the icon image 31 and the user's finger is inserted in a region corresponding to the icon image 31, the position detecting sensor 10 detects an inserting of the finger. The control unit 15 corresponds to the phrase which is "magnifying" displayed on the icon image 31 in response to the detection signal from the position detecting sensor 10 and converts the pot image displayed on the central region 2a into a magnified image.

In the same manner, when the user's finger is inserted in the region corresponding to the other icon images 32 to 44, the control unit 15 converts the image of the pot so as to correspond to each images' meaning of a phrase or sign displayed the icon images 32 to 44 (such as "demagnifying", "moving", "rotating", "color", "lighting", "opening", "closing" and "▲").

Herein, the icon image illustrated by a phrase includes a button function for selecting a mode. For example, the "demagnifying" means a decrease in size, the "moving" means whether or not to select a mode for moving a display position of the pot. The "rotating" means whether or not to select a mode for rotating the image of the pot, and the "color" means changing coloring of the pot. Moreover, the "lighting" means whether or not displaying the image which looks like lighting on the pot, or converting changes of a direction and angle of which light is irradiated. The "opening" and "closing" means an operation which is about opening and closing a cap of the pot. An icon group due to sign "▲" corresponds to an operation actually moving or rotating the pot, by manipulating the icon group again after manipulating the icon group for selecting a mode such as a moving or a rotating.

FIG. 7 is a diagram illustrating another display example of the stereoscopic image display surface 2.

In the example shown in FIG. 7, the image of the pot is displayed on the central region 2a of the stereoscopic image display surface 2, and a plurality of icon images 51 to 60 is displayed as a manipulation menu on the peripheral region 2b, as if the icon surrounds the image of the pot. The icon images 53 to 60 in FIG. 7 are an arrow image of which both end has an arrow mark. In the region provided with the arrow image, for example, when the position detecting sensor 10 detects that the user's finger acts in a direction displayed by the arrow image, the control unit 15 makes the image of the port move or rotate in accordance with a direction of which the user's finger moves. In the drawings, an assignment of the rotating and moving mode is performed by manipulating to the icon images 51 and 52.

In the display examples of FIGS. 6 and 7, it is described that the icon image is arranged to display on whole perimeter (four sides) of the stereoscopic image display surface 2 of the peripheral region 2b surrounding the central region 2a. However, for example, it may be possible that the icon image is displayed on at least only any one of four sides of the peripheral region 2b, and the side displaying the icon image is optionally selected by user. In that case, it may be allowed to expand a display range such as an object image of the central region 2a to a side in which the icon image is not displayed, in accordance with needs.

Further, as shown in FIG. 8, the same kind of the icon image group 61 and 62 symmetrically displays on a upper side portion and a lower side portion of four sides of the peripheral region 2b, that it may be provided that the upper display is a manipulating key (a button) display for a taller person, and the lower display is a manipulating key (a button) display for a shorter person. Using that manner, it may be easy to manipulate for both of the taller and the shorter.

In addition, as shown in FIG. 9, the same kind of the icon image group 71 and 72 symmetrically displays on a left side portion and a right side portion of four sides of the peripheral region 2b, that it may be provided that the left display is a manipulating key (a button) display for a left-handed person, and the right display is a manipulating key (a button) display for a right-handed person. Using that manner, it may be easy to manipulate for both of the left-handed and the right-handed person.

Second Embodiment

Next, a second embodiment of a stereoscopic two-dimensional image display device according to the invention will be described.

FIG. 10 is a view illustrating a schematic configuration of a stereoscopic two-dimensional image display device M2 of a second embodiment according to the invention. FIG. 11 is a sectional view taken along line X-X of FIG. 10 as viewed in the direction of an arrow.

The stereoscopic two-dimensional image display device M2 is further provided with a rectangular support frame (supporting member) 101 on which a user can place his hands, on the a front side of a peripheral portion of the opening 20a of the case 20 of stereoscopic two-dimensional image display device M (refer to FIG. 2) in the first embodiment. A material of the support frame 101 is not matters but it is preferable to employ the material such as wood, metal, or plastic which gives a sense of touch without a sense of incongruity when the user places hands on that. Additionally, it is also preferable that a sectional shape of the support frame 101 has better touch feeling by employing no angle shape such as a cylindrical core shape or cylindrical sell shape as shown in drawings.

Since the support frame 101 is located on the vicinity of the stereoscopic image display surface 2, the user can place hands, fingers, or the like on the support frame 101 and stably insert the hands, fingers, or the like in an interface region of the peripheral region 2b of stereoscopic image display surface 2 without hand shaking. Therefore, the user can surely give an instruction to the targeting icon image. Additionally, it is possible to perform easily an manipulation for long time since the user's hands are not tired. It also makes easily a focus of user's eyes visibly coincide with the stereoscopic two-dimensional image, and it will be expected to improve a visibility, since the support frame 101 itself performs the function as a comparable reference in a space.

The position detecting sensor 10 disposed on the inner peripheral side of the opening 20a of the case 20 may be disposed in the support frame 101. In that case, it may particularly be possible to set so as to extend a front edge of the outer wall 20b of the case 20 near the stereoscopic image display surface 2.

In addition, in the embodiment, the rectangular support frame 101 is disposed on the peripheral portion of the opening 20a of the case 20, but the same advantages may be expected by provided with a stick shaped handrail, a support for hands, or the like on the vicinity of a portion displaying the icon image.

Additionally, a transparent plate (including a diffuser plate) as the supporting member is disposed on the position itself of the stereoscopic image display surface 2 (the imaging surface) or the vicinity thereof, that a user can place his hands or fingers on the transparent plate. Therefore, the transparent plate which is an actual object supports the hands, and using the fingers or the like, it may be possible to give an instruction to the icon image displayed on the user interface region. As the result, by touching actually the transparent plate which is the actual object with an end of the fingers, an operational feeling can be obtained as if manipulating a touch panel. In that case, it is allowed that the transparent plate is not only provided on a whole surface of the stereoscopic image display surface 2, but also provided just on the user interface region (the peripheral region 2b of the stereoscopic image display surface 2).

The inner wall (the wall portion) is provided on the inner peripheral side of the outer wall 20b of the case 20 in front of the image transmitting panel 3 so as to separate the user interface region (the peripheral region 2b of the stereoscopic image display surface 2) and the other region (the central region 2a of the stereoscopic image display surface 2), and to be parallel to the outer wall 20b. It may be allowed that the order is given by using such as the fingers to the icon image displayed on the user interface region, while placing the hands or fingers on any one of the outer wall 20b and the inner wall, or both of those. In that case, by setting a surface of the inner wall with black color, an image (such as an object image) displayed on the central region 2a of the stereoscopic image display surface 2 can be formed to be projected, and it is also possible to avoid unwanted reflection or stray light.

Third Embodiment

FIG. 12 is a sectional view of a stereoscopic two-dimensional image display device M3 according to a third embodiment.

The stereoscopic two-dimensional image display device M3 is provided with an inner wall 20c of the case 20 of the stereoscopic two-dimensional image display device M (refer to FIG. 2) according to the first embodiment, and the transparent plate 110 as a rectangular frame plate shape is disposed between the outer wall 20b of the case 20 and an end of the inner wall 20c. Specifically, the transparent plate 110 and the inner wall 20c are assembled and add to the stereoscopic two-dimensional image display device M of the first embodiment. In this case, the position detecting sensor (omitted in the drawing) is disposed so as to detect a position without any affection caused by being the transparent plate 110. For example, the position detecting sensor made of a transparent electrode is built in the transparent plate 110 itself, or the position detecting sensor is built in an outer surface side of the transparent plate 110.

The transparent plate 110 is disposed on a position of the stereoscopic image display surface 2 (the imaging surface) or the vicinity thereof, and the inner wall 20c is disposed between the image transmitting panel 3 and the stereoscopic image display surface 2 so as to be parallel to the outer wall 20b and separate the user interface region (the peripheral region 2b of the stereoscopic image display surface 2) and the other region (the central region 2a of the stereoscopic image display surface 2). Therefore, the transparent plate 110 disposed between ends of the inner wall 20c and outer wall 20b so as to correspond to the user interface region. A surface of the inner wall 20c is set to be black color for suppressing a reflection.

As mentioned above, the inner wall 20c is provided so as to separate the user interface region and the other region. Therefore, the image (the object image) displayed on the central region 2a of the stereoscopic image display surface 2 can be made to be projected, and it is also possible to avoid the unwanted reflection or the stray light. Additionally, a visibility is improved by a depth feeling, since the outer wall 20b or the inner wall 20c is visible as a reference object in the space.

Since an instruction can be given to the icon image displayed on the user interface region by touching actually the transparent plate 110 which is the actual object with an end of the fingers, it is possible to have not a feeling of instability like holding manipulating hands in space and easily manipulate not to be tired. Therefore, an operational feeling can be obtained as if manipulating a touch panel.

In the embodiment mentioned above, it is described in the case that the whole (the central region 2 and the peripheral region 2b) of the stereoscopic image display surface 2 (the imaging surface) is the same plane, but it may be possible to make differences in a floating amount in the screen of the images of the central region 2a and the peripheral region 2b, since the central region 2a and the peripheral region 2b have level differences in a depth direction. More in detail, by inserting mediums having a refractive index different from that of air in the space of the stereoscopic image display surface 2 (the imaging surface) and the display unit 1 (a display), distances of the user interface region (the peripheral region 2b) and the other region (the central region 2a) from the display unit 1 are made to be different from each other. That is, it is provided a imaging position varying means for making the position of the imaging surface of the user interface region (the peripheral region 2b) and the other region (the central region 2a) to be different from each other, between the stereoscopic image display surface 2 and the display unit 1.

It is possible to use a glass, resin, or liquid as the medium functioning of the imaging position varying means. The imaging position varying means is disposed on an arbitrary position between the display unit 1 and the stereoscopic image display surface 2, and the imaging position of light propagating through the imaging position varying means is made to be different from that of light not propagating through. Consequently, it is possible that the imaging surface of the user interface region and the other region have the level differences. In that case, the refractive index of the medium or thickness of that can change a degree of the level difference.

Fourth Embodiment

FIGS. 13(a) and 13(b) are sectional views of a stereoscopic two-dimensional image display devices M4a and M4b according to a fourth embodiment.

The stereoscopic two-dimensional image display devices M4a and M4b are further provided with a medium 120 as an imaging position varying means between the display unit 1 and the stereoscopic image display surface 2 of the stereoscopic two-dimensional image display device M (refer to FIG. 2) of the first embodiment.

It is illustrated that the stereoscopic two-dimensional image display device M4a of 13(a) is a example disposing the medium 120 as the imaging position varying means between the display unit 1 and the image transmitting panel 3, and the stereoscopic two-dimensional image display device M4b of 13(b) is a example disposing the medium 120 as the imaging position varying means between the image display panel 3 and the stereoscopic image display surface 2. In any cases, the medium 120 is disposed to correspond to the peripheral region 2b which is the user interface region.

As mentioned before, by disposing the medium 120 which is the imaging position varying means to correspond to the user interface region, the image having the level difference can be displayed on the user interface region and the other region. The image having the level difference may enable to provide a three-dimensional manipulation and motion, since the image according to the floating amount in the depth direction is differently viewed to the user. For example, adding the motion in the depth direction, it enables an intuitive manipulation (a pressing or pulling manipulation), and it can be obtained to be wide in a manipulating variation. Accordingly, it enables not only to make three-dimensional effect but also to increase a visibility, a fun, and a manipulative performance.

To perform a manipulation in the depth direction, it is preferable that the position detecting sensor 10 is configured as a three-dimensional sensor or equipped with a two-dimensional sensor as many as a number of planes having the level difference, so as to be capable of detecting a position in the depth direction.

Of course, it may be possible to use a lens as the imaging position varying means. It is preferable to use a Fresnel lens which is thin and easy to increase in aperture as the lens.

Fifth Embodiment

FIGS. 14(a) and 14(b) are sectional views of a stereoscopic two-dimensional image display devices M5a and M5b of a fifth embodiment.

The stereoscopic two-dimensional image display devices M5a and M5b are further provided with Fresnel lenses 131 and 132 as an imaging position varying means, between the display unit 1 and the stereoscopic image display surface 2 of the stereoscopic two-dimensional image display device M (refer to FIG. 2) of the first embodiment, particularly on the image transmitting panel 3.

In the stereoscopic two-dimensional image display device M5a of FIG. 14(a), a Fresnel screen 131 is disposed on a position only corresponding to the central region 2a of the stereoscopic image display surface 2 but not disposed on a position corresponding to the peripheral region 2b which is the user interface region. Additionally, in the stereoscopic two-dimensional image display device M5b of FIG. 14(b), a Fresnel lens 132 cutting a central portion is disposed on the image transmitting panel 3, so the Fresnel lens 132 does not exist on a position corresponding to the central region 2a of the stereoscopic image display surface 2, and the Fresnel lens 132 only exists on a position corresponding to the peripheral region 2b which is the user interface region.

As mentioned before, by employing a configuration which dispose the Fresnel lens corresponding to one direction of the user interface region and the other region and does not dispose the Fresnel lens corresponding to the other direction, the image having the level difference can be displayed on the user interface region and the other region. The image having the level difference may enable to provide a three-dimensional manipulation and motion, since the image according to the floating amount in the depth direction is differently viewed to the user. For example, adding the motion in the depth direction, it enables an intuitive manipulation (a pressing or pulling manipulation), and it can be obtained to be wide in a manipulating variation. Accordingly, it enables not only to make three-dimensional effect but also to increase a visibility, a fun, and a manipulative performance.

Sixth Embodiment

FIG. 15 is a sectional view of a stereoscopic two-dimensional image display device M6 of a sixth embodiment.

The stereoscopic two-dimensional image display device M6 is provided with an inner wall 20c that separates the user interface region (the peripheral region 2b) and the other region (the central region 2a) of the stereoscopic image display surface 2 in front of the image transmitting panel 3 inside the case 20 of the stereoscopic two-dimensional image display device M (refer to FIG. 2) in the first embodiment so as to be parallel to the outer wall 20b. The medium 120 is disposed between the inner wall 20c and the outer wall 20b so as to correspond to the user interface region. A surface of the inner wall 20c is set to be a black color suppressing a reflection.

In the stereoscopic two-dimensional image display device M6, the inner wall 20c is provided so as to separate the user interface region and the other region in the case 20, so the image (the object image) displayed on the central region 2a of the stereoscopic image display surface 2 can be made to be projected, and it is also possible to avoid the unwanted reflection or the stray light. Additionally, a visibility is improved by a depth feeling, since the outer wall 20b or the inner wall 20c is visible as a reference object in the space.

Additionally, by disposing the medium 120 which is the imaging position varying means to correspond to the user interface region, the image having the level difference can be displayed on the user interface region and the other region. The image having the level difference may enable to provide a three-dimensional manipulation and motion, since the image according to the floating amount in the depth direction is differently viewed to the user. For example, adding the motion in the depth direction, it enables an intuitive manipulation (a pressing or pulling manipulation), and it can be obtained to be wide in a manipulating variation. Accordingly, it enables not only to make three-dimensional effect but also to increase a visibility, a fun, and a manipulative performance.

Seventh Embodiment

FIG. 16 is a sectional view of a stereoscopic two-dimensional image display device M7 of a seventh embodiment.

The stereoscopic two-dimensional image display device M7 is provided with the transparent plate 110 between front ends of the outer wall 20b and the inner wall 20c of the stereoscopic two-dimensional image display device M6 (refer to FIG. 15) according to the sixth embodiment.

In the stereoscopic two-dimensional image display device M7, adding to the advantages of the sixth embodiment, in that an instruction can be given to the icon image displayed on the user interface region by touching actually the transparent plate 110 which is the actual object with an end of the fingers, it is possible to easily manipulate not to be tired without a feeling of instability like holding manipulating hands in space. Therefore, an operational feeling can be obtained as if manipulating a touch panel.

Hereinafter, it will be described about a detailed display example of the image having the level difference.

FIG. 17 is a view illustrating a display example of the stereoscopic two-dimensional image display device formed to be viewed as if the image of the central region 2a floats more front than the image of the peripheral region 2b. It is illustrated that FIG. 17(a) is a before manipulation state and FIG. 17(b) is an after manipulation state.

As shown in FIG. 17(a), an icon image group 81 to 86 (a thumbnail) which is a miniature symbol of plural objects is displayed only the user interface region (the peripheral region 2b) as the image before the manipulation. For example, an icon image 81 of the user interface region is touched by a finger and the finger is moved to the central region 2a, then the image is converted into an image of FIG. 17(b) in response to the manipulating. Specifically, according to the image of FIG. 17(b), a magnifying image 81A of the manipulated icon image 81 is displayed on the central region 2a. At this time, the image of the peripheral region 2b which is the user interface region is viewed as a deep position, but the image of the central region 2b is formed to be viewed as a front position. Therefore, the user's amazement increases since an object looks like truly projecting over the level difference.

Alternatively, the converted image returns again to the image display of FIG. 17(a), when the user performs a manipulation which makes the magnifying image 81A displayed on the central region 2a move to the peripheral region 2b. The same manipulation can be applied to all of the icon images 81 to 86, that an amusement increases comparing to case that the level difference display does not exists.

FIG. 18 is a view illustrating another display example in case of being formed to be viewed as if the image of the central region 2a floats more front than the image of the peripheral region 2b in the state of placing the level difference. The icon images 31 to 44 of the user interface region is the exactly same as the example in FIG. 6, but the object image of the central region 2a is viewed more front than the icon images 31 to 44 of the user interface region, thereby increasing the amazement. A converting manipulation of the image in that case is the same as the case shown in the example of FIG. 6.

FIG. 19 illustrates a display example in the case of being formed to be viewed as if the image of the central region 2a retrojects rather than the image of the peripheral region 2b. The icon images 31 to 44 of the user interface region are exactly the same as the example in FIG. 18, and the manipulation is also the same.

Eighth Embodiment

FIG. 20 is a sectional view of a stereoscopic two-dimensional image display device M8 of an eighth embodiment.

In the stereoscopic two-dimensional image display device M8, the inner wall 20c of the stereoscopic two-dimensional image display device M6 (refer to FIG. 15) of the sixth embodiment is disposed between the display unit 1 and the image transmitting panel 3.

As mentioned above, the position detecting sensor 10 is disposed to correspond to the imaging surface 2 (the stereoscopic image display surface) displaying virtual three-dimensional image, and the stereoscopic two-dimensional image display devices M1 to M8 of the embodiments is performed to change the display image according to the output signal from the position detecting sensor 10 at the time of receiving a physical motion from outside. For example, the user acts the physical motion (in detail, the user stretches and moves his hand or finger) toward the display image, and thus the image change according to user's purpose can be made to occur. Consequently, due to the position detecting sensor 10, it is possible to configure the user interface that the user directly can participate in the display image, and the user can enjoy changing the image in an active situation, thereby increasing an amusement.

Particularly, in the embodiment, the position detecting sensor 10 performs sensing the peripheral portion 2b of the region corresponding to the display unit of the imaging surface 2, and configures the sensing region of the peripheral region as the user interface region, and thus the user gives an order to the image in the user interface region while the user can place hands on the supporting member (such as a part of the case) which is near the peripheral region 2b of the imaging surface 2. Therefore, since the order is can be given without a hand shaking in state of fixing the position of the hand, it is possible to perform the accurate manipulation and the user's hands are not tired. Therefore, it is possible to perform easily a manipulation for long time.

In the embodiment, a transparent plate 110 is disposed on the user interface region formed on the imaging surface 2, that the user can give an order while placing his hands or fingers on the transparent plate 110. That is, the transparent plate which is an actual object supports the hands, and it may be possible to give an order to the icon image displayed on the user interface region by using the fingers or the like. For example, by touching actually the transparent plate 110 which is the actual object with an end of the fingers, an operational feeling can be obtained as if manipulating a touch panel.

Additionally, in the embodiment, the inner wall 20c that separates the user interface region and the other region is provided. Therefore, a separation of the image displaying respectively the user interface region and the other region becomes clearly. Particularly, since the surface of the inner wall 20c is set to be a black color, visual distinguishment easily enables, an effect of light which is not necessary can be removed, and thus the image can be projected.

In addition, it is further easy to distinguish images of the user interface region and the other region since the wall portion 20c is provided in the space between the image transmitting panel 3 and the imaging surface 2.

In the embodiment, distances in the range from the display unit 1 to the user interface region and the other region are made to be different from each other, and the level difference in the depth direction can be given between the images of both of the regions. Consequently, a difference in the floating amount in the screen can be given. Therefore, the amusement increases since the user feels the operational feeling in the depth direction.

As a method of giving the level difference between the user interface region and the other region, there is a method providing the imaging distance varying member between the display unit 1 and the imaging surface 2. For example, it is possible to provide the imaging distance varying members 120, 131, and 132 between the display unit 1 and the image transmitting panel 3 or provide the imaging distance varying members 120, 131, and 132 between the image transmitting panel 3 and the imaging surface 2.

A lens can be also used as imaging distance varying member. Particularly, in the case of a thin lens such as Fresnel lens, the lens may be disposed on the image transmitting panel.

Since the support frame 101 is disposed on the vicinity of an image displaying on the user interface region and a portion of the user's body is supported by the supporting member 101, the user can place hands, fingers, or the like on the support frame 101 and stably insert the hands, fingers, or the like in an interface region. Therefore, the user can clearly give an order of a manipulation targeting definitely. Additionally, it is possible to perform easily an manipulation for long time since the user's hands are not tired. It also makes easily a focus of user's eyes visibly coincide with the stereoscopic two-dimensional image, and it will be expected to improve a visibility, since the support frame itself performs the function as a comparable reference in a space.

This application is based on Japanese Patent Application No. 2004-288662 filed on the 30 Sep. 2004, which is incorporated herein by reference.

REFERENCE NUMERALS

Figure 1:
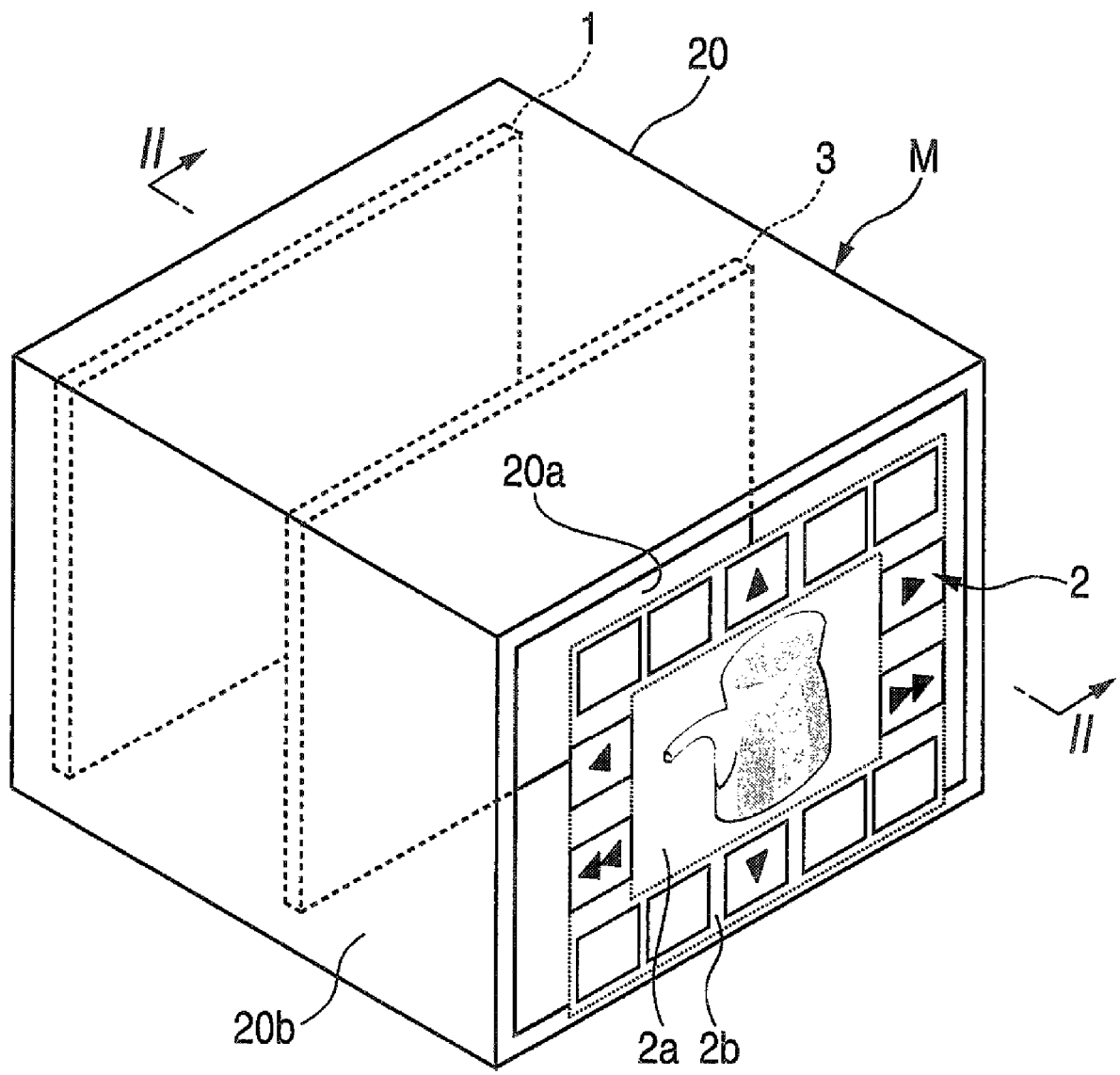
FIG. 1 is a perspective view illustrating a schematic configuration of a stereoscopic two-dimensional image display device M of a first embodiment according to the invention.
Figure 2:
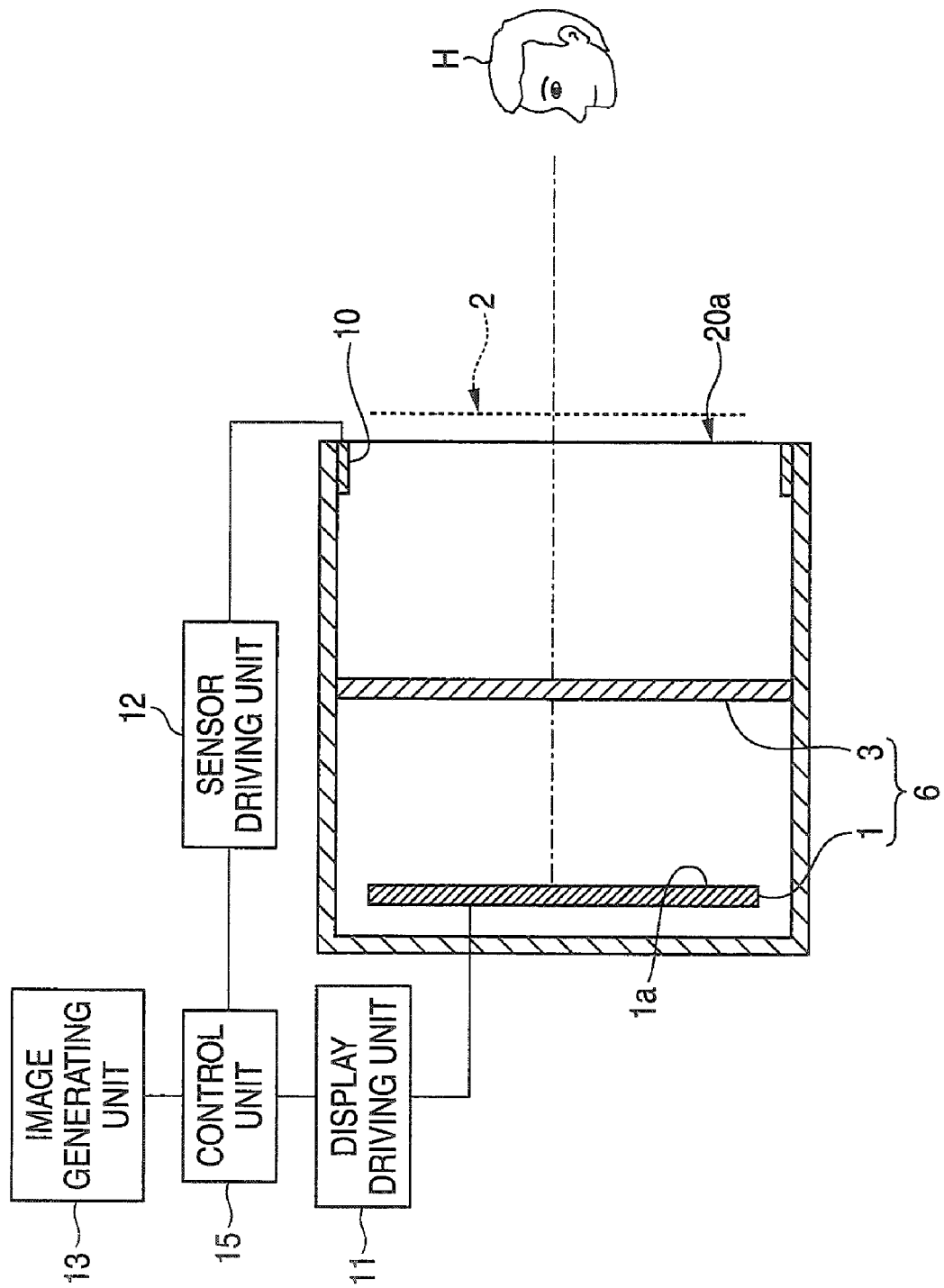
FIG. 2 is a sectional view taken along line II-II of FIG. 1 as viewed in the direction of an arrow.
Figure 3:
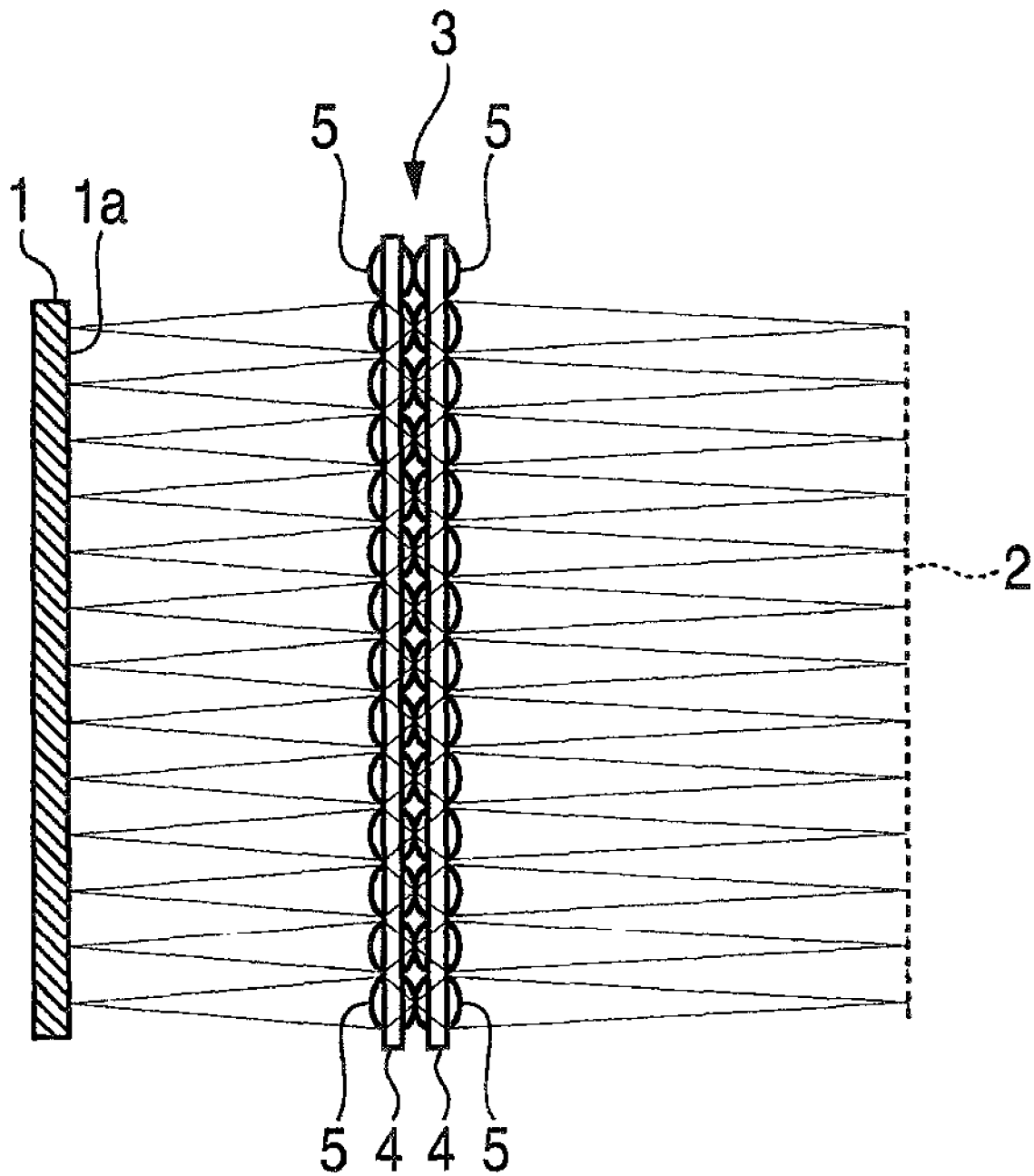
FIG. 3 is a diagram illustrating a relation among a display unit, image transmitting panel and a stereoscopic image display surface (an imaging surface) in the same stereoscopic two-dimensional image display device M.
Figure 4:
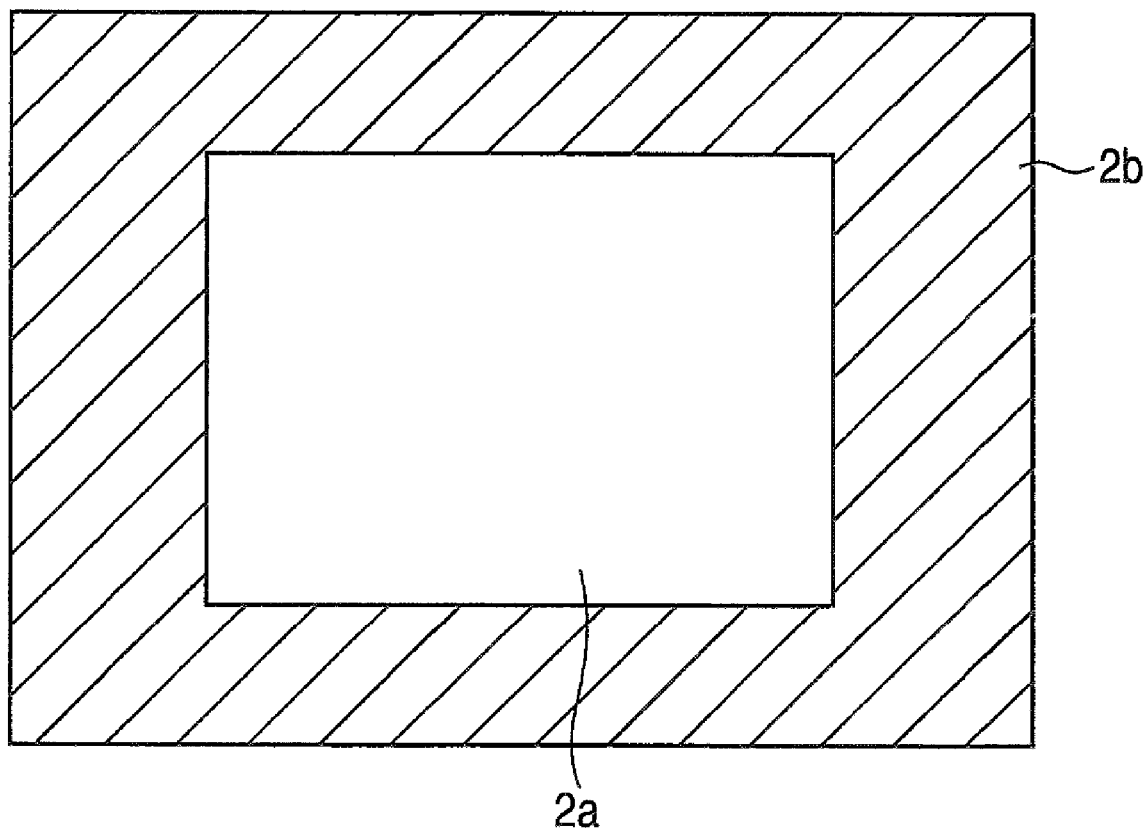
FIG. 4 is a schematic diagram illustrating the stereoscopic image display surface seen from a front.
Figure 5:
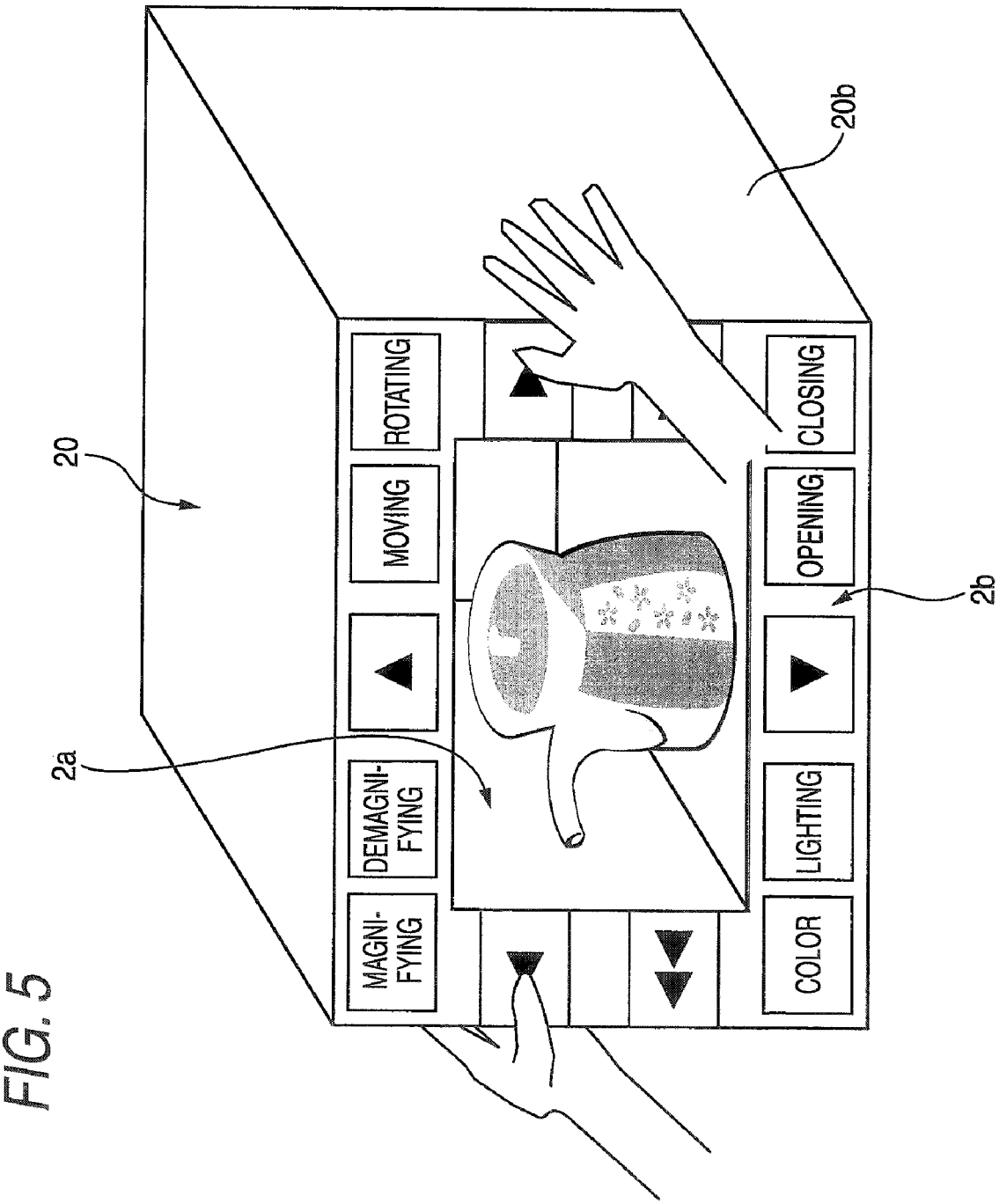
FIG. 5 is a view illustrating a state that a user manipulates the stereoscopic two-dimensional image display device M by using his finger.
Figure 6:
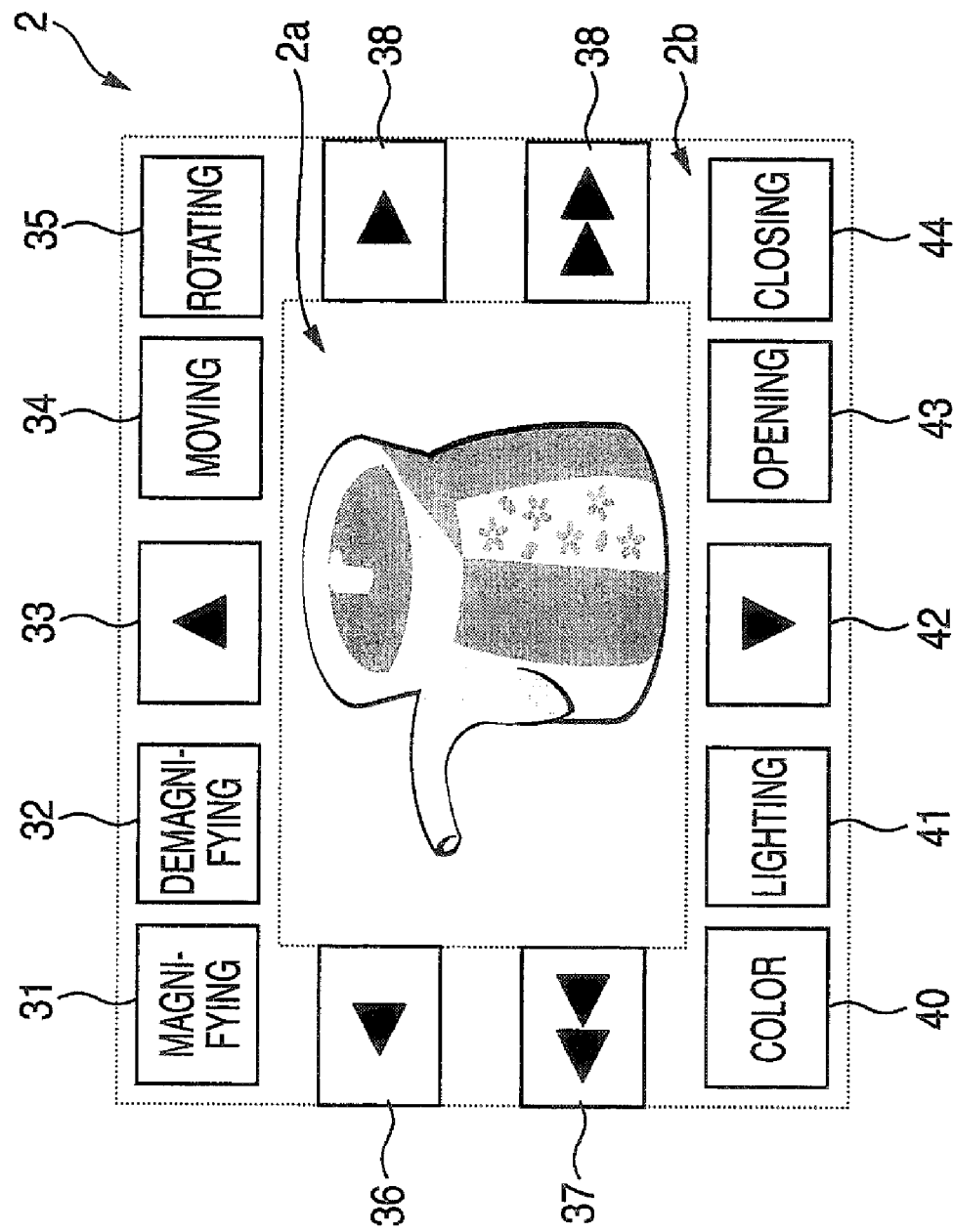
FIG. 6 is a diagram illustrating a display example of the stereoscopic two-dimensional image display device M.
Figure 7:
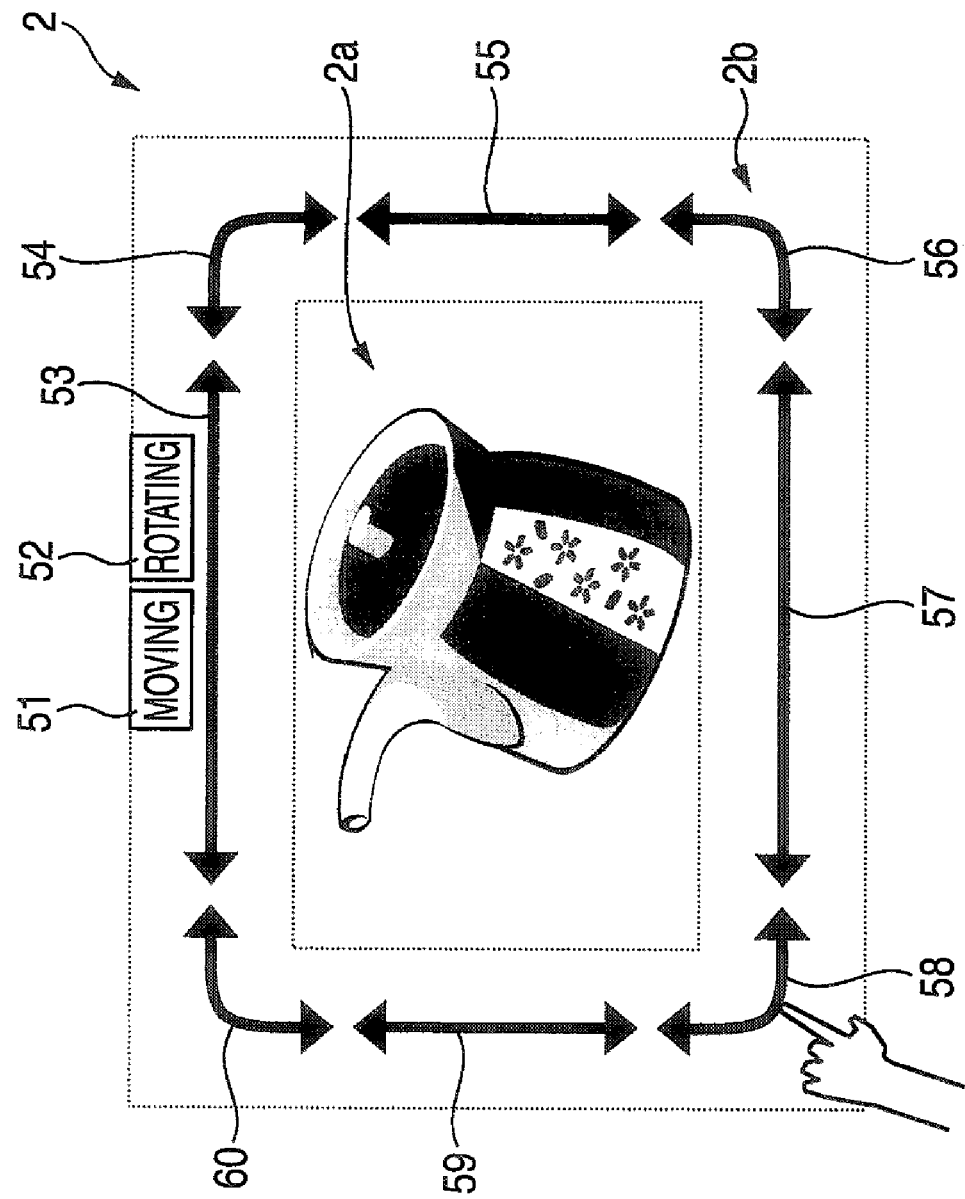
FIG. 7 is a diagram illustrating another display example.
Figure 8:
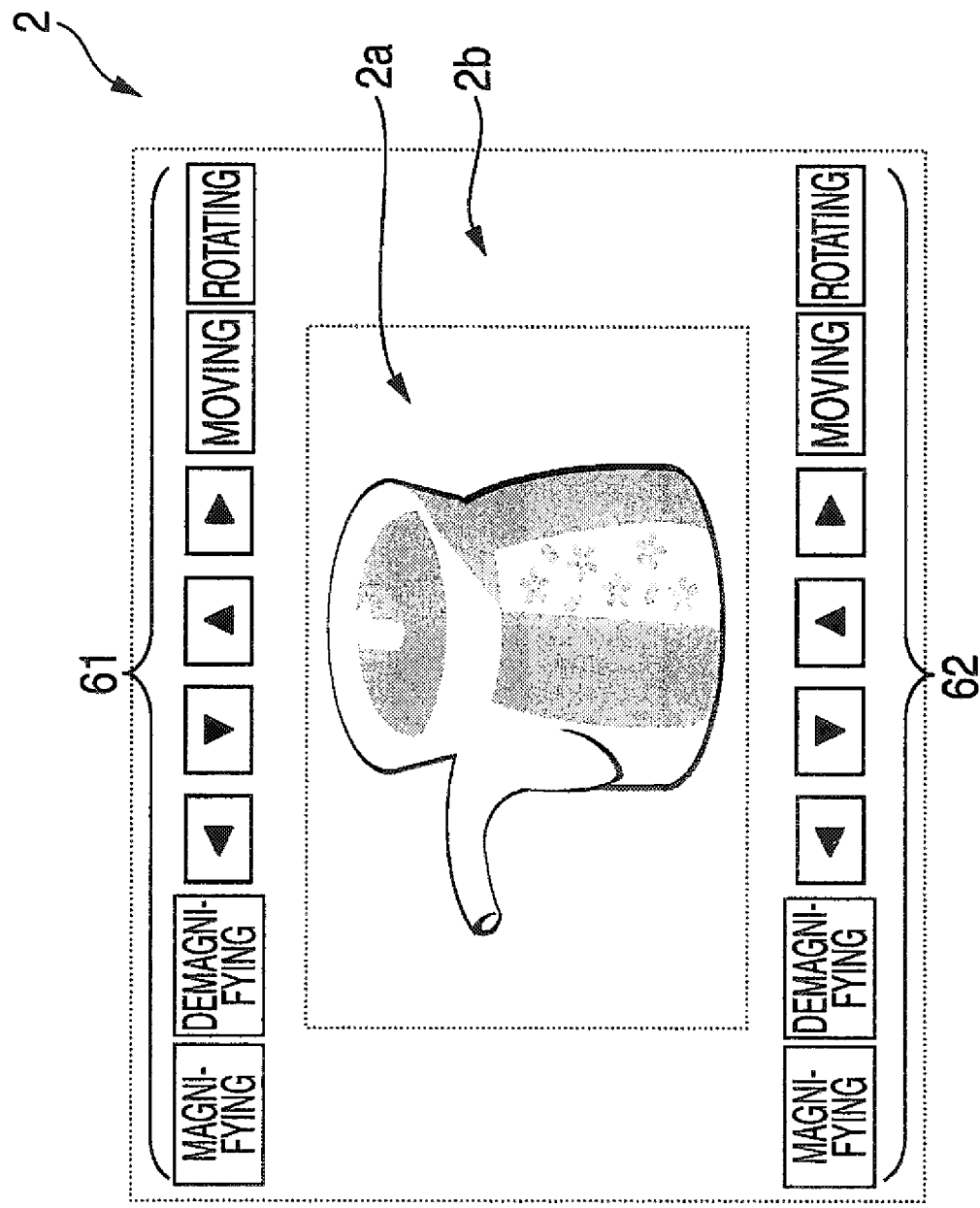
FIG. 8 is a diagram illustrating another display example.
Figure 9:
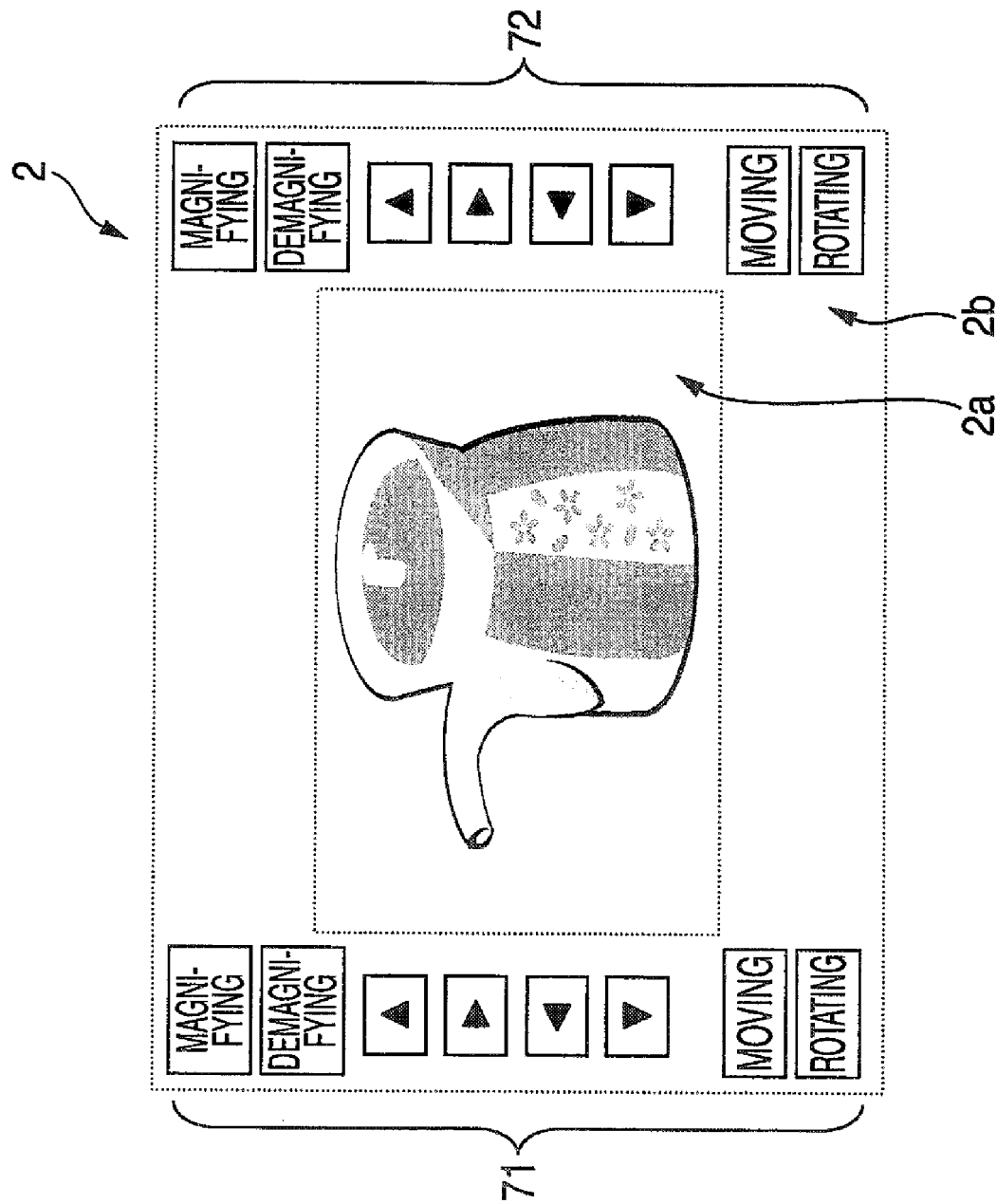
FIG. 9 is a diagram illustrating the other display example.
Figure 10:
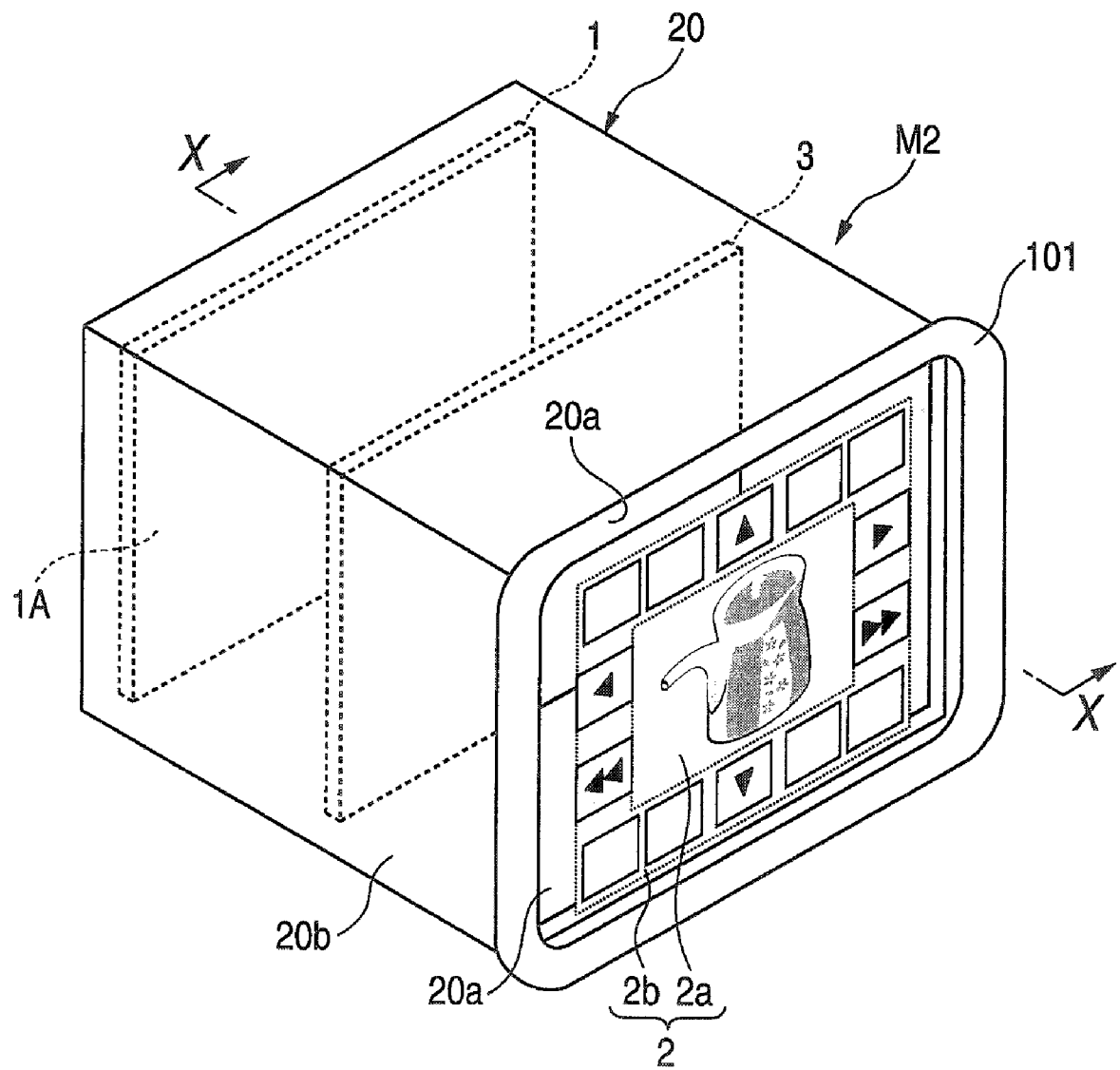
FIG. 10 is a perspective view illustrating a schematic configuration of a stereoscopic two-dimensional image display device M of a second embodiment according to the invention.
Figure 11:
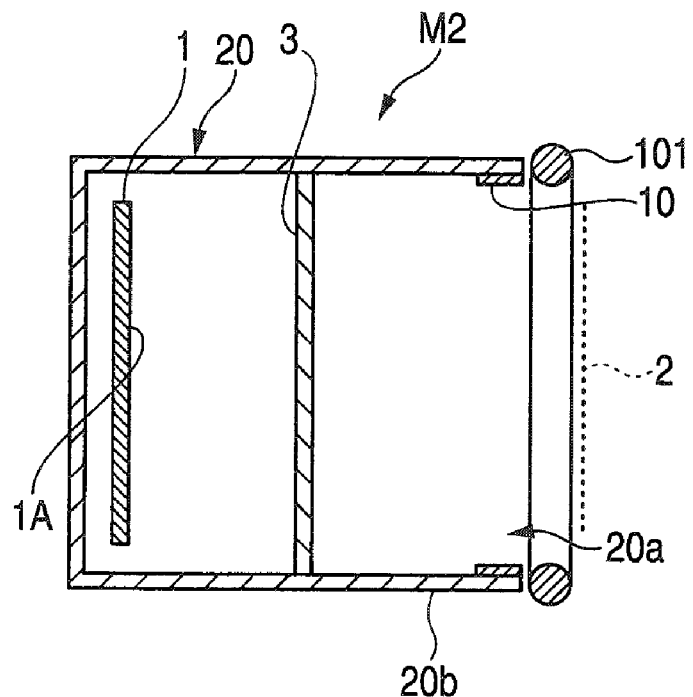
FIG. 11 is a sectional view taken along line X-X of FIG. 10 as viewed in the direction of an arrow.
Figure 12:
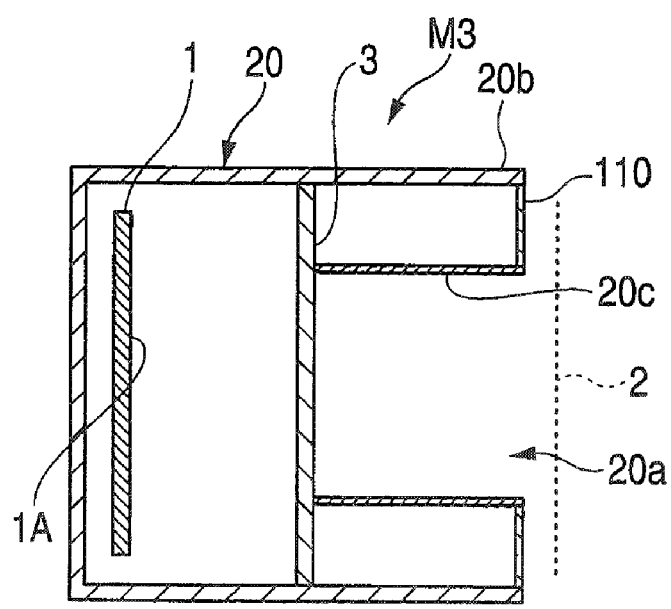
FIG. 12 is a sectional view illustrating a schematic configuration of a stereoscopic two-dimensional image display device M3 of a third embodiment according to the invention.
Figure 13:
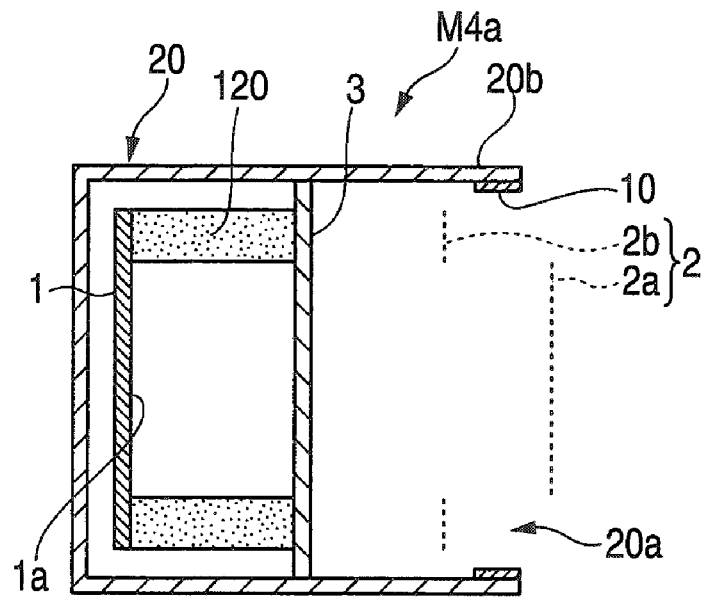
FIGS. 13(*a*) and 13(*b*) is a sectional view illustrating a schematic configuration of a stereoscopic two-dimensional image display devices M4*a* and M4*b* of a fourth embodiment according to the invention.
Figure 13:
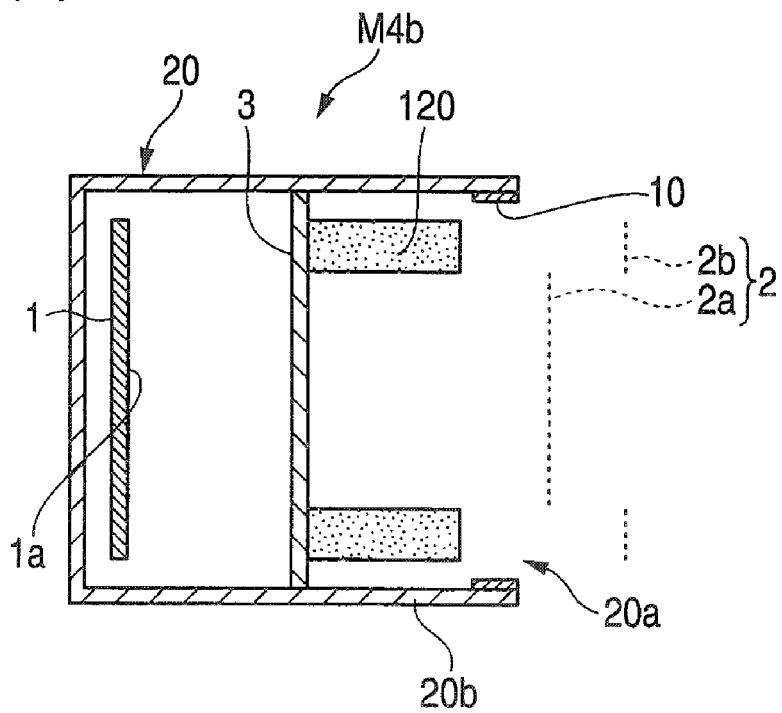
Figure 14:
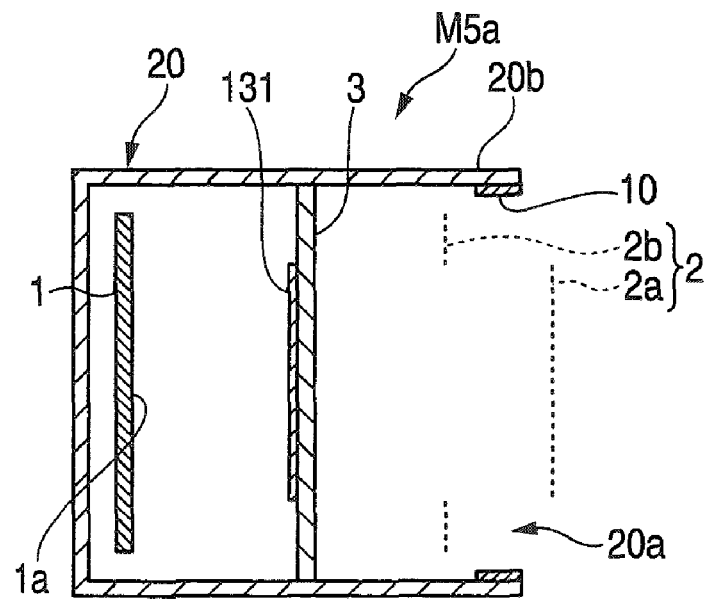
FIGS. 14(*a*) and 14(*b*) are sectional views illustrating a schematic configuration of a stereoscopic two-dimensional image display devices M5*a* and M5*b* of a fifth embodiment according to the invention.
Figure 14:
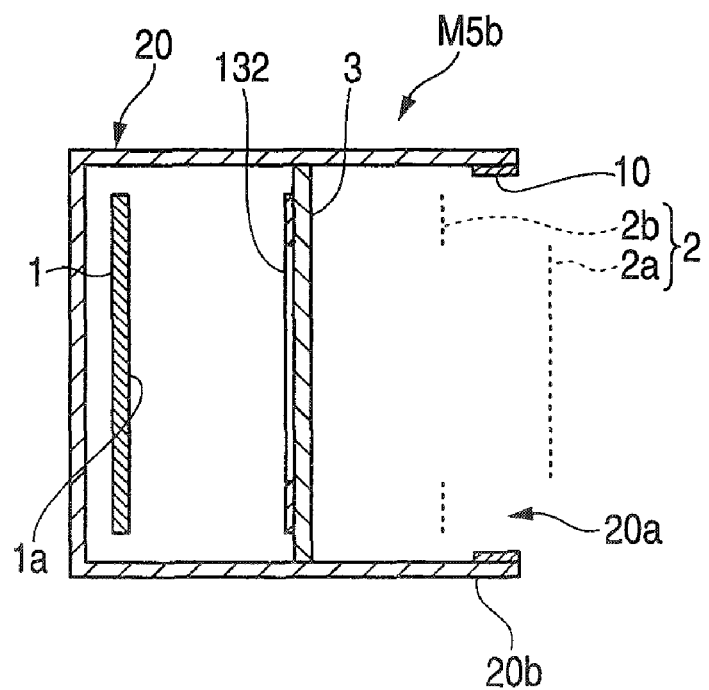
Figure 15:
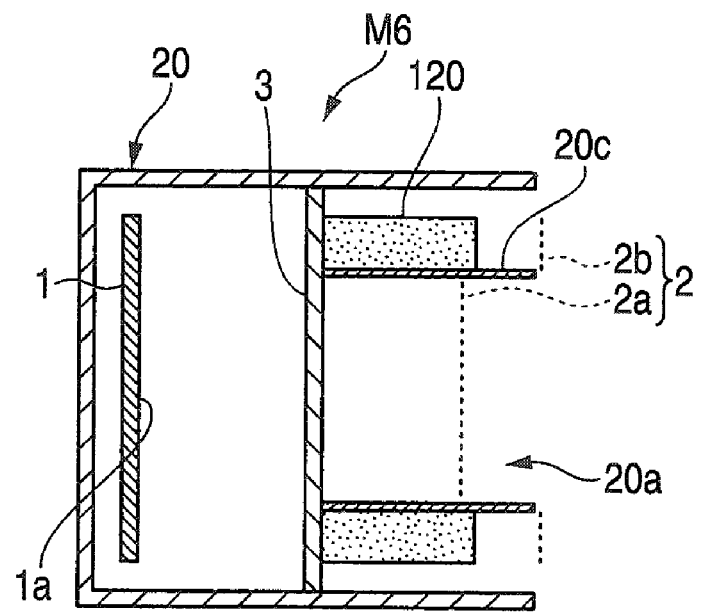
FIG. 15 is a sectional view illustrating a schematic configuration of a stereoscopic two-dimensional image display device M6 of a sixth embodiment according to the invention.
Figure 16:
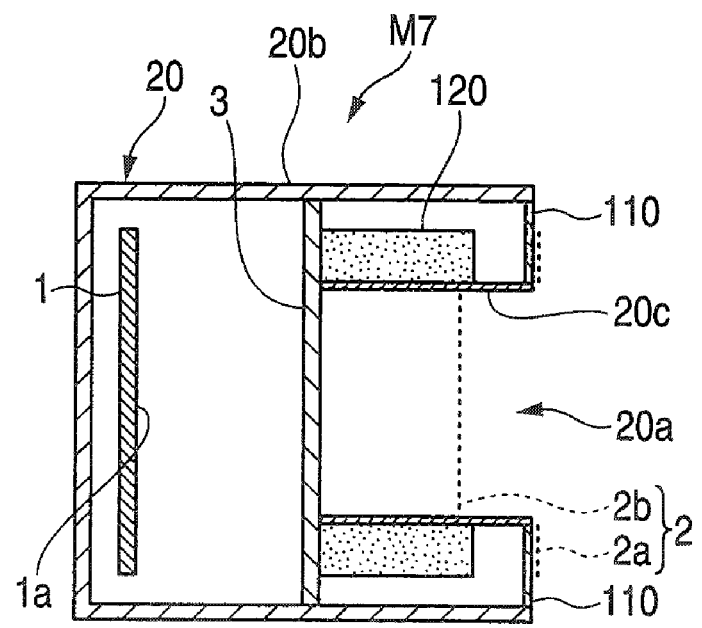
FIG. 16 is a sectional view illustrating a schematic configuration of a stereoscopic two-dimensional image display device M7 of a seventh embodiment according to the invention.
Figure 17:
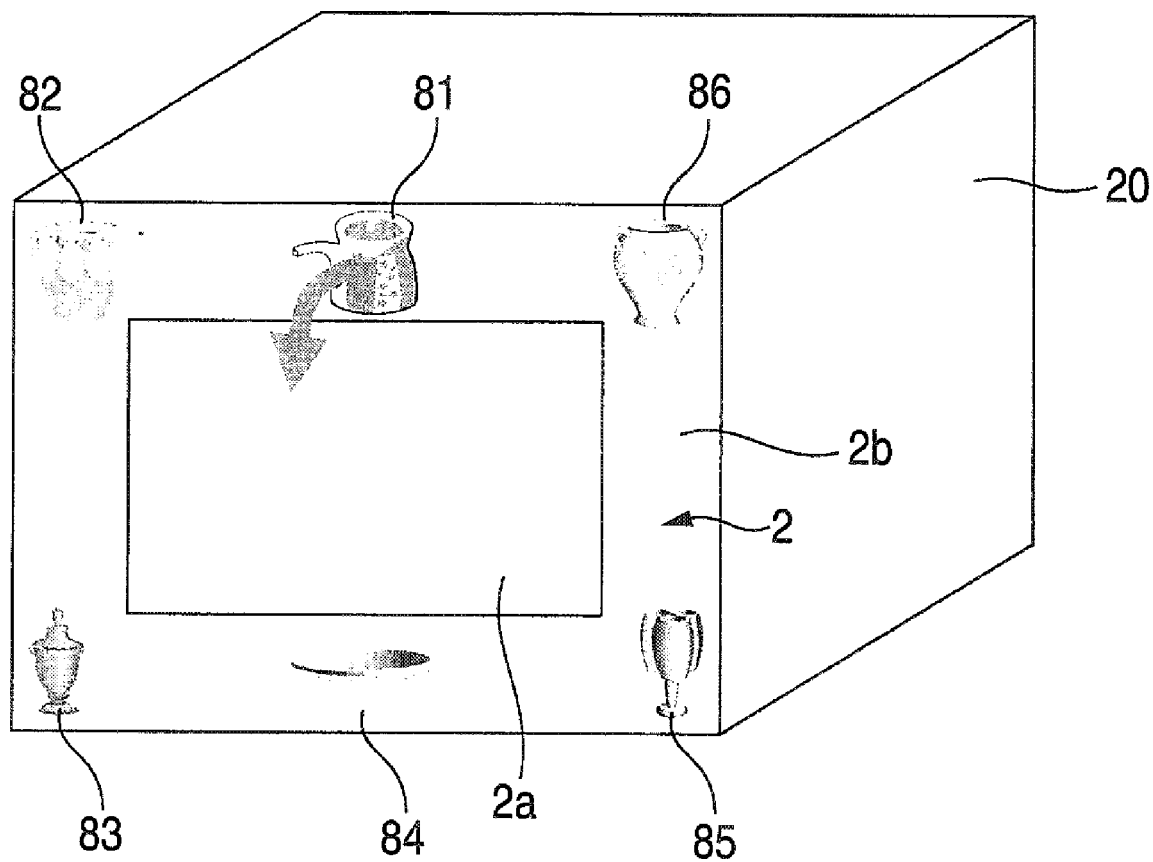
FIG. 17 is a view illustrating a display example when an image having a level difference is displayed, and FIGS. 17(*a*) and 17(*b*) are views illustrating states before and after the manipulation respectively.
Figure 17:
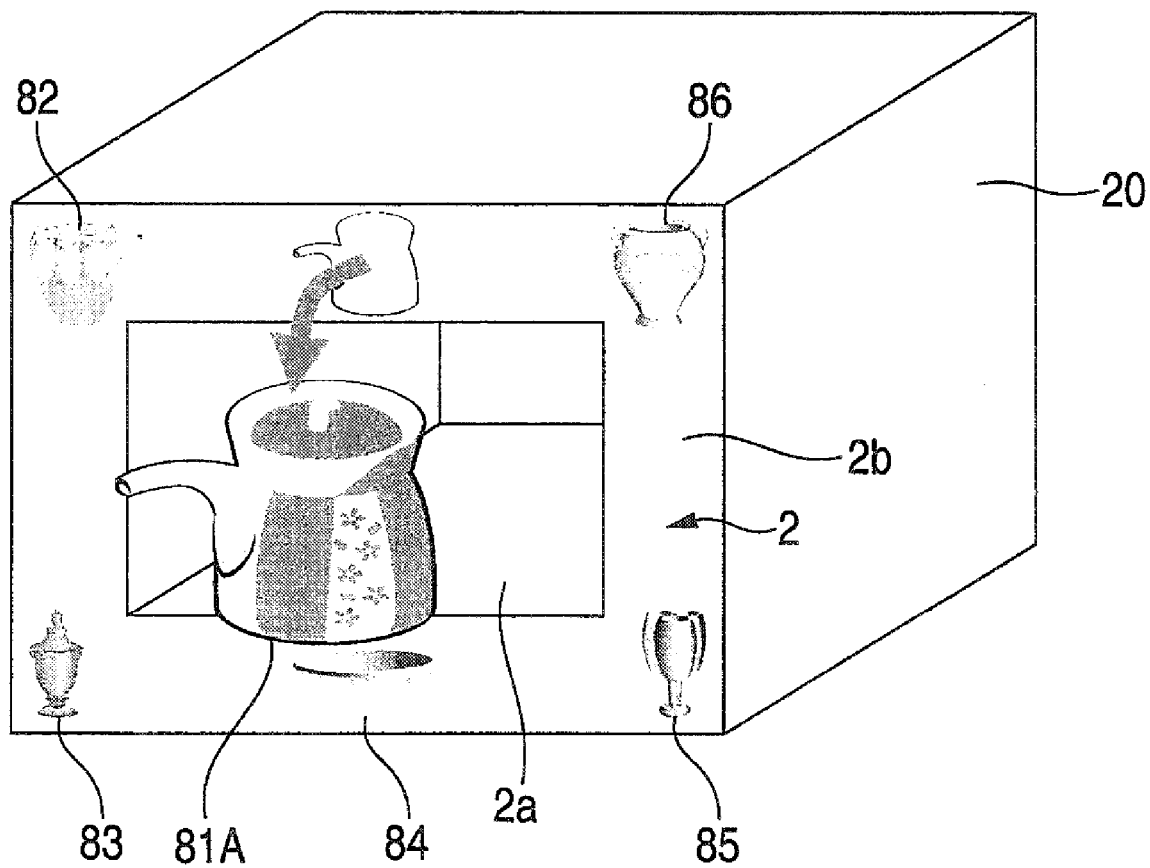
Figure 18:
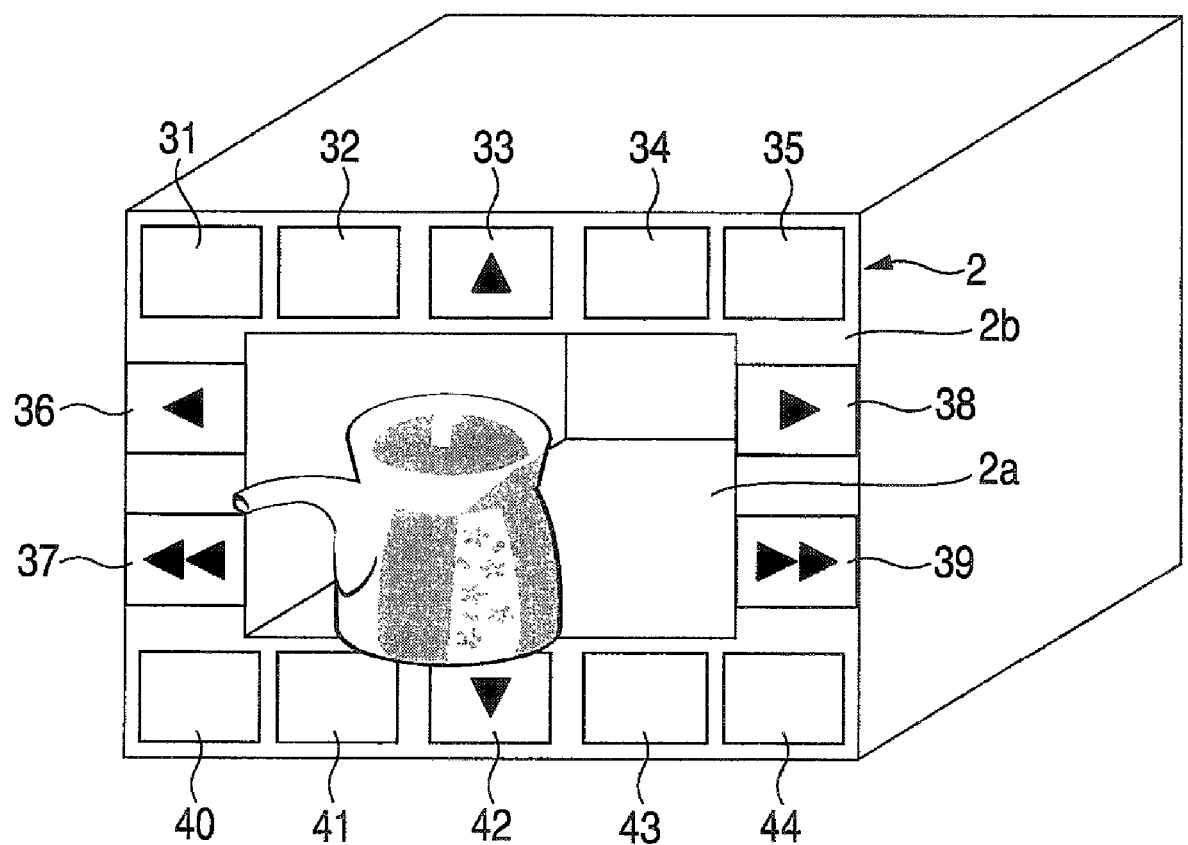
FIG. 18 is a view illustrating a display example when an image having a level difference is displayed and an example when an image of a central region is shown as if it projects in a front direction.
Figure 19:
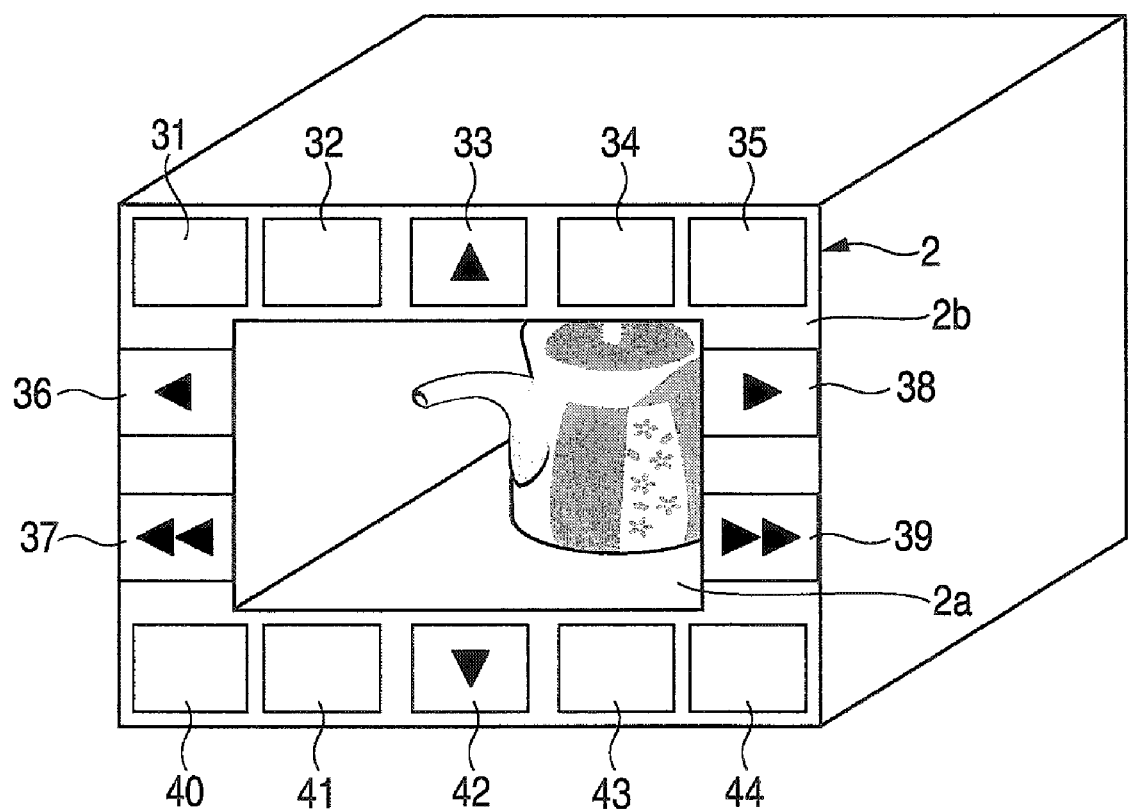
FIG. 19 is a view illustrating a display example when an image having a level difference is displayed and an example when an image of a central region is shown as if it retrojects in an inner direction.
Figure 20:
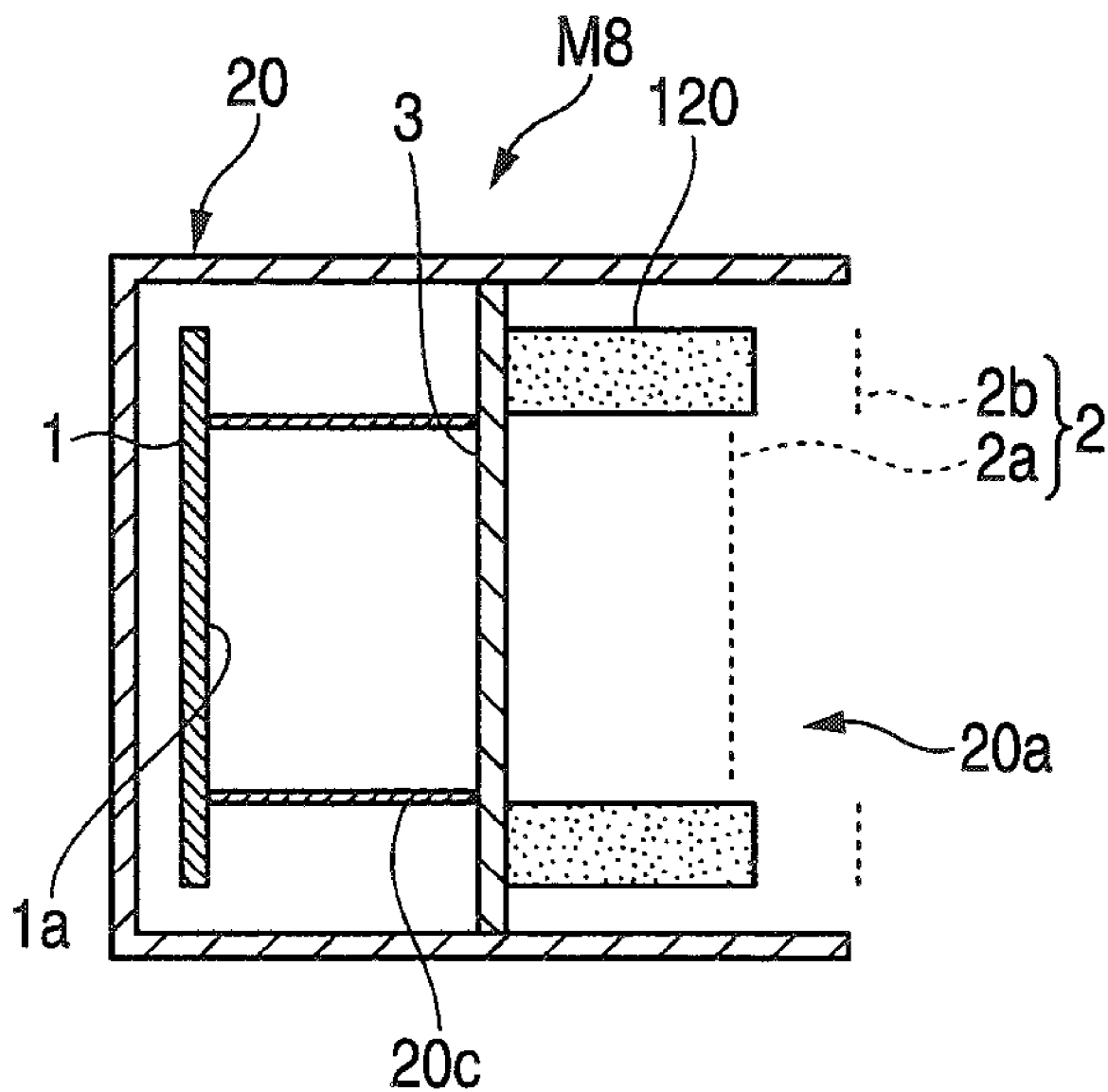
FIG. 20 is a sectional view illustrating a schematic configuration of a stereoscopic two-dimensional image display device M8 of an eighth embodiment according to the invention.

1: DISPLAY UNIT
1A: IMAGE DISPLAY SURFACE
2: STEREOSCOPIC IMAGE DISPLAY SURFACE (IMAGING SURFACE)
2*a*: CENTRAL REGION (REGION OTHER THAN USER INTERFACE REGION)
2*b*: PERIPHERAL REGION (USER INTERFACE REGION)
3: IMAGE TRANSMITTING PANEL
6: STEREOSCOPIC IMAGE DISPLAY UNIT
10: POSITION DETECTING SENSOR
15: CONTROL UNIT
20: CASE
20*a*: OPENING
20*b*: OUTER WALL
20*c*: INNER WALL (WALL PORTION)
101: SUPPORT FRAME
110: TRANSPARENT PLATE
120: MEDIUM (IMAGING DISTANCE VARYING MEMBER)
131, 132: FRESNEL LENS (IMAGING DISTANCE VARYING MEMBER)

The invention claimed is:

1. A stereoscopic two-dimensional image display device comprising:
  a stereoscopic image display unit including:
  a display unit having an image display surface that displays an image; and
  an image transmitting panel that is disposed apart from the image display surface,
  wherein the stereoscopic image display unit displays a stereoscopic two-dimensional image by imaging light emitted from the image display surface, on an imaging surface in a space located at a side opposite to the display unit with respect to the image transmitting panel;
  a position detecting sensor that outputs an output signal corresponding to a position of a detection target inserted a user interface region formed on the imaging surface; and
  a control unit that changes the image displayed on the image display surface in accordance with the output signal from the position detecting sensor so as to change the stereoscopic two-dimensional image displayed on the imaging surface, wherein the user interface region is formed on a peripheral portion of the imaging surface.

2. The stereoscopic two-dimensional image display device according to claim 1,
wherein the position detecting sensor senses a peripheral portion of a region on the imaging surface corresponding to the display unit, and
wherein the stereoscopic image display unit displays the image to correspond to a region sensed by the position detecting sensor, whereby the user interface region is formed on the imaging surface.

3. The stereoscopic two-dimensional image display device according to claim 1, wherein a transparent plate is disposed to the user interface region on the imaging surface.

4. The stereoscopic two-dimensional image display device according to claim 1, further comprising a wall portion that separates the user interface region from the other region.

5. The stereoscopic two-dimensional image display device according to claim 4, wherein the wall portion is provided in a space between the image transmitting panel and the imaging surface.

6. The stereoscopic two-dimensional image display device according to claim 4, wherein the wall portion is provided in a space between the display unit and the image transmitting panel.

7. The stereoscopic two-dimensional image display device according to claim 1, wherein distances from the display unit to the user interface region and the other region are different from each other.

8. The stereoscopic two-dimensional image display device according to claim 7, wherein an imaging distance varying member allowing the distances from the display unit to the user interface region and the other region to be different from each other is provided between the display unit and the imaging surface.

9. The stereoscopic two-dimensional image display device according to claim 8, wherein the imaging distance varying member is provided between the display unit and the image transmitting panel.

10. The stereoscopic two-dimensional image display device according to claim 8, wherein the imaging distance varying member is provided between the image transmitting panel and the imaging surface.

11. The stereoscopic two-dimensional image display device according to claim 1, wherein the imaging distance varying member is a lens.

12. The stereoscopic two-dimensional image display device according to claim 11, wherein the lens is disposed on the image transmitting panel.

13. The stereoscopic two-dimensional image display device according to claim 1, further comprising a supporting member which is disposed at the vicinity of the stereoscopic two-dimensional image displayed to correspond to the user interface region so as to support a portion of a user's body.

14. The stereoscopic two-dimensional image display device according to claim 1, wherein the image transmitting panel is a micro lens array.

* * * * *